United States Patent [19]

Crommelijnck

[11] 3,736,862
[45] June 5, 1973

[54] DEVICE FOR THE MANUFACTURE OF A COOKED DELICACY

[76] Inventor: Herman Crommelijnck, Destouvellestratt 5, Schaarbeek, Belgium

[22] Filed: Jan. 13, 1969

[21] Appl. No.: 790,798

[30] Foreign Application Priority Data

Jan. 12, 1968 Belgium..................................53296
Jan. 16, 1968 Belgium..................................53384

[52] U.S. Cl. .........................99/353, 99/405, 99/407
[51] Int. Cl. ..............................................A475 27/14
[58] Field of Search.......................99/405, 406, 407,
99/426, 353, 354, 355, 432, 442

[56] References Cited
UNITED STATES PATENTS 2,550,758   5/1951   Bemis....................................99/407
2,926,597   3/1960   Porambo..............................99/405 X
3,132,949   5/1964   Crowe..................................99/405 X Primary Examiner—Robert W. Jenkins
Attorney—Cushman, Darby, Cushman

[57] ABSTRACT

Apparatus for cooking slices of dough includes an endless conveyor member such as a belt or drum dipping into a pan of hot fat for conveying the slices through the fat and a supply belt and discharge belt cooperating with the endless conveyor for gripping the slices therebetween at least at the surface of the fat. A shaping device bends the cooked slices to the shape of potato chips.

13 Claims, 6 Drawing Figures

PATENTED JUN 5 1973
3,736,862
SHEET 1 OF 2
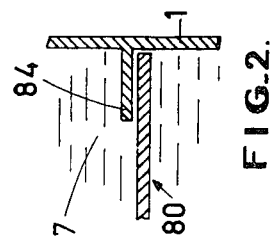
FIG_2.
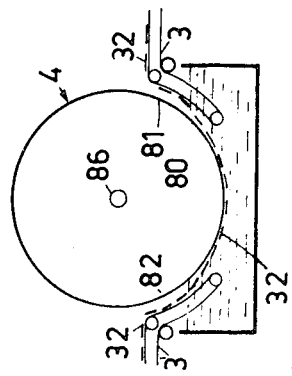
FIG_3.
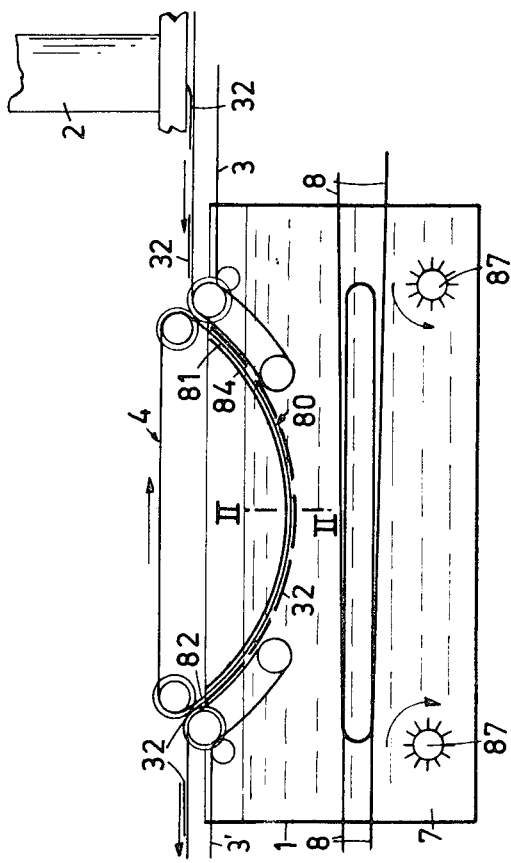
FIG_4.
Inventor
Herman Crommelijnck
By Cushman, Darby & Cushman
Attorneys

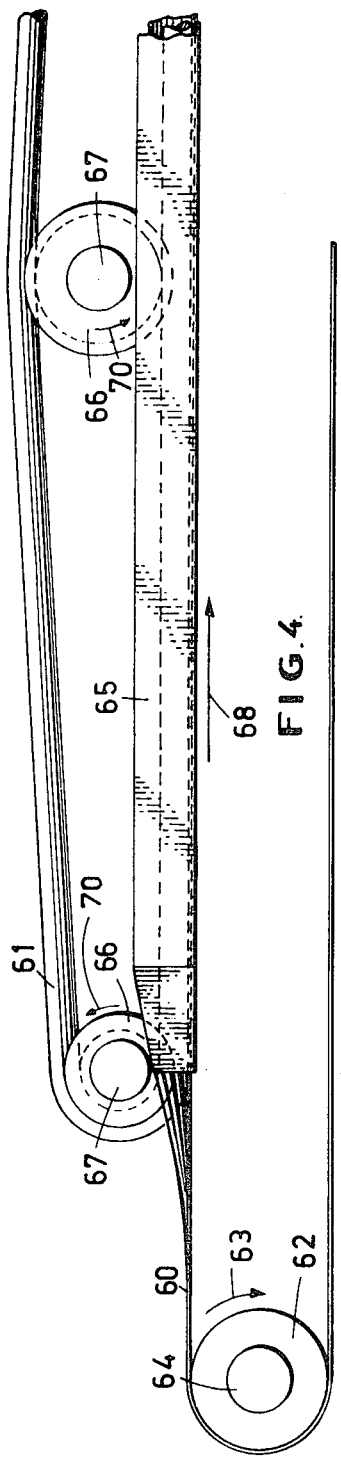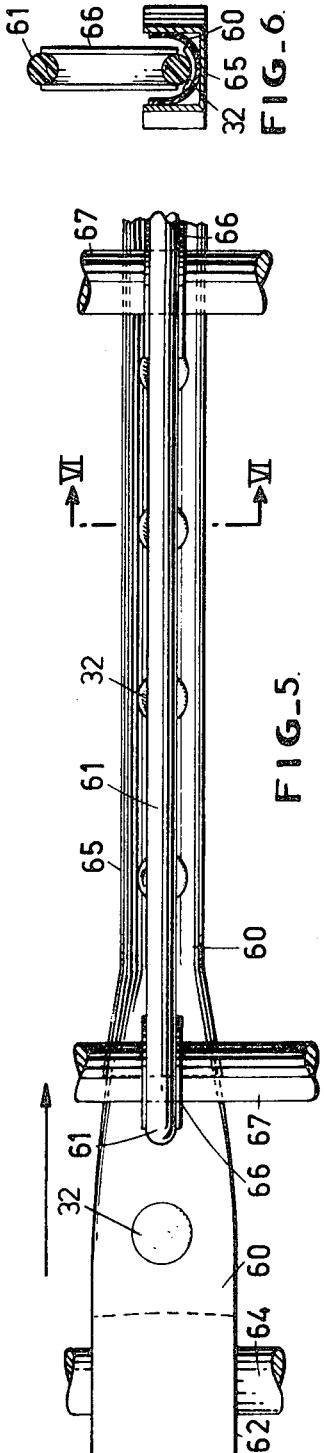

DEVICE FOR THE MANUFACTURE OF A COOKED DELICACY

The invention relates to a device for preparing a cooked delicacy, which comprises a cooking pan with molten fat or oil, and the lowest part of at least one carrying element on the one side of the cooking pan enters into the fat or oil and it comes out again on the opposite side, so as to convey the slices to be cooked, in a dipped condition, through the fat or the oil.

According to the invention, at least opposite both ends of said dipped lowest part of the carrying element, adjacent the surface of the fat or oil, is mounted a supply or discharge conveying belt, the shortest spacing of which to said ends of the dipped lowest part of said carrying element is at the most half the diameter of the slices to be cooked, whereby these conveying belts move along the same direction and substantially at the same speed, which results in the slices to be cooked, which are supplied on the supply belt, being conveyed by the entry into the oil or fat, between this conveying belt and the lowest part of said element and then, by leaving said latter conveying belt, being pushed by the upwards force acting on the slices, against the lowest part of the element to be further taken along therewith to that end of the element lowest part which cooperates with the discharge belt, on which the thus-cooked slices settle down to be carried out of the oil or fat.

In a particular embodiment of the invention, the device comprises means for shaping the slices discharged from the oil or molten fat, said means comprising two pressure elements movable in parallel relationship, along the same direction and substantially at the same speed, whereby a first pressure element extends some distance away around part at least of the second element, along a direction at right angle to the movement direction of the elements, in such a way that between this part of the second element and the first element is formed a space along said movement direction, and whereby means are provided to bring the slices at the one end of said space between the elements, as these slices should be conveyed between said elements and undergo a bending round the second element, and to discharge the bent slices out of said space at the opposite end thereof.

With the device according to this embodiment, delicacies are obtained with a more attractive and useful appearance. This appearance corresponds substantially to the one of known potato chips.

Usefully, the pressure elements have on the sides thereof facing one another, substantially cylindrical surfaces which bound in part said space and the lengthwise axis of which extends along the movement direction of the elements, whereby the curvature centers are located on the same side relative to these surfaces and the curvature radius of that surface adjacent the curvature centers is smaller than the one of the other surface.

Other details and features of the invention will stand out from the description given below by way of non limitative example and with reference to the accompanying drawings, in which:

FIG. 1 is a diagrammatic front view, partly cut-away, of part of a device according to a first embodiment of the invention, for preparing a cooked delicacy. FIG. 2 is a cross-section along line II—II of FIG. 1.

FIG. 3 is a diagrammatic front view, partly cut-away, of part of a second embodiment of the invention.

FIG. 4 is a front view, partly cut-away, of means for shaping flexible cooked slice-like food products.

FIG. 5 is a view from above, partly cut-away, corresponding to FIG. 4.

FIG. 6 is a cross-section along line VI—VI of FIG. 5.

In the various figures, the same reference numerals pertain to similar elements.

The device according to FIGS. 1 and 2 is mainly comprised of a cooking pan 1, a cutting apparatus 2 and driven conveying belts 3, 4 and 3' which move partly in the oil provided in the cooking pan 1. These conveying belts 3, 3' and 4 are comprised either of a perforated flexible plate or of spaced rods.

The lowest part 80 of the conveying belt 4, which comprises a carrying element, is guided along guides 84 provided on the inner wall of the pan 1, it enters at the one end of the cooking pan 1 into the oil 7 and it comes out thereof on the other side, so as to lead dough slices 32 through the oil 7. The conveying belt 3 forms the supply belt for the slices 32 formed by the cutting apparatus 2 and ends, after being bent downwards, inside the oil 7, opposite the end 81 of the lowest part 80 of the conveying belt 4, in parallel relationship thereto and with a spacing which is at the most equal to half the diameter of a slice 32 and which is preferably substantially equal to the thickness of a slice 32 to be cooked.

In the same way, that end of the conveying belt 3' facing said part 80 is curved in parallel relationship with this part 80, with a spacing equal at the most to half the diameter of a slice 32 and preferably substantially equal to the thickness of the cooked slices 32. This conveying belt 3' comprises the discharge belt and leads the cooked slices 32 to a shaping apparatus (not shown), wherein the slices undergo some bending and thus obtain the appearance of the known potato chips.

THe conveying belts 3 and 3' move along the same direction and substantially at the same speed as the lowest part 80 of the conveying belt 4.

The dough slices 32 brought on the supply belt 3 are thus conveyed through the oil between the part 80 and the conveying belt, without an accumulation being possible at the level of the oil surface. By leaving the conveying belt 3, the slices in the oil are pushed under the influence of the rising force, against the lowest part of the conveying belt 4 and they are thereby conveyed further in the oil 7 to the discharge belt 3' on which they settle down adjacent the oil surface, when leaving the pan 1.

Moreover, in the oil bath 7 are also provided electric heaters 8 which bring the oil temperature to approximately 260°C. To prevent the oil burning, while still obtaining a good heat transfer in the oil, adjacent the heaters 8 are provided rotating cylinders 87 with scoops, which cause a forced circulation in the oil bath 7.

In FIG. 3 is shown a device according to a second embodiment of the invention.

This device differs from the one shown in FIG. 1 due to the conveying belt 4 thereof being replaced by a drum 4 rotating about its axis 86. The purpose and the function of this drum 4 are completely the same as in the case of the conveying belt 4 in FIG. 1.

The cylindrical wall of the drum 4 may for instance be comprised of rods in parallel relationship with the axis 86 of the drum which are so spaced as to let the oil circulate through the drum wall and thus to insure the cooking of the slices on both sides.

The device also comprises means for shaping the slices 32 discharged from the oil 7. This means is not shown in FIGS. 1 to 3, but it is shown separately in FIGS. 4 to 6.

This means is comprised mainly of a substantially horizontal movable conveying belt 60 and a circular-section movable belting 61 which is arranged above the belt 60. The conveying belt 60 is made of flexible material, such as "Nylon", and passes over rolls 62 which rotate in the direction of arrow 63 about an axis 64. The top part of the conveying belt 60 is lead through a U-shaped trough 65 which is smaller than the conveying belt 60, in such a way that the side edges thereof are bent along the upright walls of the trough 65 and the conveying belt has a cylindrical shape as shown in FIG. 6. The trough 65 is funnel-shaped at the inlet thereto so as to reach a gradual bending upwards of the conveying belt 60.

The belting 61 extends over the whole length of the conveying belt 60 and passes about small wheels 66 which rotate about axes 67 parallel to the axes 64, along the direction of arrow 70, in such a way that the facing parts of the conveying belt 60 and of the belting 61 move in the direction of arrow 68. The speed of the axes 64 and 67 is such that the linear speed of the conveying belt 60 is the same as the one of the belting 61. Moreover, the vertical lengthwise symmetry plane of the belt 60 coincides with the one of the belting 61.

The smallest vertical spacing between the conveying belt 60 and the belting 61 is substantially equal to the thickness of the cooked slices 32 to be bent therebetween, a few of which only have been shown in the figures. The shaping produced on the slices 32 may be noticed particularly in FIG. 6.

This means is advantageously located directly after the cooking device for the slices 32 shown in FIGS. 1 and 2, or in FIG. 3, in such a way that these slices are still flexible and may easily undergo, without breaking, the desired shaping. During such shaping or directly thereafter, the slices then undergo a drying which makes the shaping permanent.

The slices 32 to be shaped, when leaving the oil bath 7 are brought on the conveying belt 60, and lead in the trough 65 under the belting 61 to undergo therearound a bending under the influence of the pressure exertd by the belting 61 on the slices 32. The length of the trough 65 and of the belting 61 is so chosen that when leaving the latter, the distorted slices 32 are stiff enough to retain the shape they have been given.

The above-described devices have a very simple construction and the length of the conveying belts is minimized. Further, the danger of an accumulation of slices due to the rising force acting thereon, both as they enter into the oil bath and as they leave it, is completely avoided as the slices are in these critical locations actually retained between the conveying element 4 and the conveying belts 3 and 3', and they are thus gradually lead in and out of the oil bath.

The invention is in no way limited to the above embodiments and many changes may be brought therein without departing from the scope of the invention as defined by the appended claims.

I claim:

1. Device for the manufacture of a cooked delicacy comprising a cooking pan adapted to contain molten fat or oil, at least one carrying element dipping into the pan so as to convey the slices to be cooked through the fat or the oil, in which opposite each end of said dipped lowest part of the carrying element, adjacent the surface of the fat or oil, there is mounted a conveying belt, the shortest spacing of which to said carrying element at the location of the surface of the fat or oil is substantially equal to the thickness of the slices to be cooked, these conveying belts being movable along the same direction and substantially at the same speed, which results in the slices to be cooked, which are supplied on one of the belts, being conveyed by the entry into the oil or fat, between this conveying belt and the lowest part of said carrying element and then, by leaving said latter conveying belt, being pushed by the upwards force acting on the slices, against the lowest part of the carrying element to be further taken along therewith to that end of the carrying element which cooperates with the other belt, on which the thus-cooked slices settle down to be carried out of the oil or fat, said device further comprising means for shaping the slices discharged from the oil or molten fat, said means comprising two pressure elements movable in parallel relationship, along the same direction and substantially at the same speed, whereby a first pressure element extends some distance away around part at least of the second element, along a direction at right angle to the movement direction of the elements, in such a way that between this part of the second element and the first element is formed a space along said movement direction, and whereby means are provided to bring the slices at the one end of said space between the elements, as these slices should be conveyed between said elements and undergo a bending round the second element, and to discharge the bent slices out of said space at the opposite end thereof.

2. Device as claimed in claim 1, in which the pressure elements have on the sides thereof facing one another, substantially cylindrical surfaces which bound in part said space and the lengthwise axis of which extends along the movement direction of the elements, whereby the curvature centers are located on the same side relative to these surfaces and the curvature radius of that surface adjacent the curvature centers is smaller than the one of the other surface.

3. Device as claimed in claim 1, in which the shortest spacing between said elements is substantially equal to the thickness of a slice to be bent between the elements.

4. Device as claimed in claim 1, in which means are provided to push resiliently said slice into the space between said elements.

5. Device as claimed in claim 1, in which at least the first pressure element is comprised of a conveying belt.

6. Device as claimed in claim 5, in which said conveying belt is flexible and cooperates, at least adjacent the second element, on its sides with guide members which bend upwards both edges towards the second element, to some distance thereof, so as to form a surface which is curved about said element.

7. Device as claimed in claim 6, in which the guide members are comprised of a trough in which the conveying belt is guided and the width of which is smaller than the one of the conveying belt, in such a way that the side edges of the belt are bent along the side walls of the trough and the central part moves substantially along the trough bottom.

8. Device as claimed in claim 7, in which the trough narrows gradually at the inlet thereof to obtain a corresponding gradual bending of the conveying belt inside the trough.

9. Device as claimed in claim 1, in which the second pressure element is comprised of a belting moving opposite the first element about small wheels.

10. Device as claimed in claim 9, in which that side of the belting facing the first pressure element is rounded.

11. Device as claimed in claim 10, in which the belting has a circular cross-section.

12. Apparatus for cooking slices of a food product of uniform thickness in a bath of heated oil or the like comprising: a flexible endless carrier belt having a lower run immersed in the bath; guide means guiding said lower run in a curve extending from a supply point above the surface of the bath downwardly through the bath and then upwardly to a discharge point above the surface of the bath; a supply conveyor belt and a discharge conveyor belt cooperating with said carrier belt at said supply point and discharge point, respectively, for supplying and discharging slices, said conveyor belts having curved portions parallel to said carrier belt and extending from above the surface of the bath to below the surface of the bath, said curved portions being spaced from said carrier belt a distance substantially equal to the thickness of the slices so as to prevent accumulation of the slices at the surface of the bath.

13. Device for the manufacture of a cooked delicacy comprising: a cooking pan adapted to contain molten fat or the like; a drum rotatable about its axis and dipping into the pan so as to convey the slices to be cooked through the fat in which opposite each side of said dipped lowest part of the drum, adjacent the surface of the fat, there is mounted a conveying belt, the shortest spacing of which to said drum at the location of the surface of the fat is substantially equal to the thickness of the slices to be cooked, these conveying belts being movable along the same direction and substantially at the same speed, which results in the slices to be cooked, which are supplied on one of the belts, being conveyed by the entry into the oil between this conveying belt and the lower part of said drum and then, by leaving said latter conveying belt, being pushed by the upwards force acting on the slices, against the lowest part of the drum to be further taken along therewith to that side of the drum which cooperates with the other belt, on which the thus-cooked slices settle down to be carried out of the oil or fat.

* * * * *